United States Patent [19]

Mosley

[11] Patent Number: 4,548,486

[45] Date of Patent: Oct. 22, 1985

[54] TRANSPARENCY MOUNT PROVIDING ROTATABLE PROJECTION IMAGE

[76] Inventor: Kenneth C. Mosley, 219 Worcester, NE., Grand Rapids, Mich. 49503

[21] Appl. No.: 511,388

[22] Filed: Jul. 6, 1983

[51] Int. Cl.[4] .............................................. G03B 1/48
[52] U.S. Cl. ...................................... 353/95; 353/120
[58] Field of Search ................. 353/1, 2, 46, 110, 108, 353/122, DIG. 5, DIG. 3, 95, 11, 12, 13, 101, 120, 23; 350/4.1, 4.2; 272/8 P, 10

[56] References Cited

U.S. PATENT DOCUMENTS

| | | | |
|---|---|---|---|
| 1,384,479 | 7/1921 | Mosure | 40/463 |
| 2,250,297 | 7/1941 | Ditty et al. | |
| 2,267,649 | 12/1941 | Graves | 353/12 |
| 2,714,330 | 8/1955 | Frederickson | 353/12 |
| 2,960,906 | 11/1960 | Fogel | 353/12 X |
| 2,961,922 | 11/1960 | Schwartz et al. | 353/16 |
| 3,072,015 | 1/1963 | Thannhauser | |
| 3,324,765 | 6/1967 | Smith | |
| 3,671,115 | 6/1972 | Larkin | |
| 3,843,244 | 10/1974 | Facchini | |
| 3,881,814 | 5/1975 | Madison | 353/95 |
| 4,188,101 | 2/1980 | Masuda | 353/95 |

FOREIGN PATENT DOCUMENTS 1287988  2/1962  France .......................... 353/110

*Primary Examiner*—Harry N. Haroian
*Attorney, Agent, or Firm*—Price, Heneveld, Huizenga & Cooper

[57] ABSTRACT

The specification discloses a slide mount which may be used in a conventional slide projector enabling the film transparency to be rotated during image projection. More particularly, the mount comprises a body to be stationarily supported in the projector and a film-supporting assembly rotatably supported by the body. The film-supporting assembly is engageable at one edge of the body by a rotatable driving mechanism. Preferably, the film-supporting assembly is registered against the body in a direction perpendicular to the film to provide critical focus for the film.

18 Claims, 7 Drawing Figures

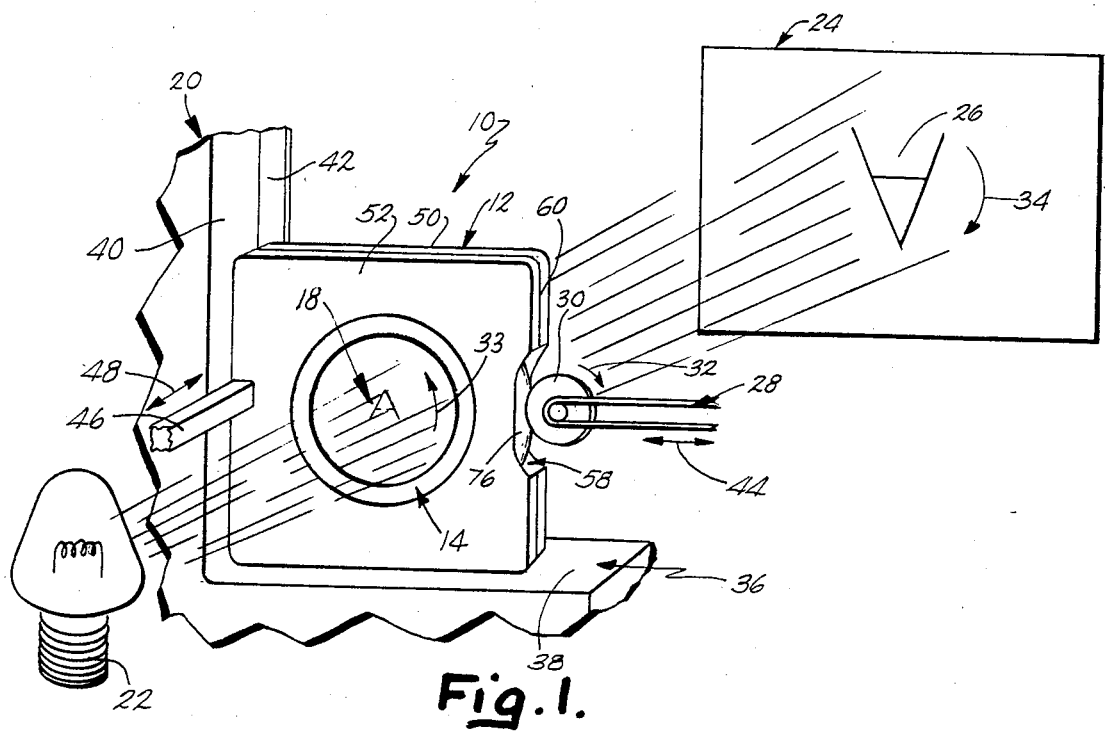
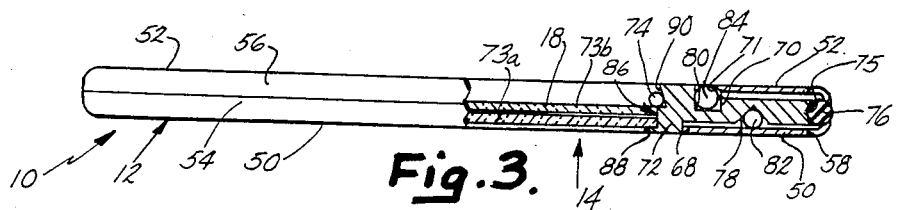
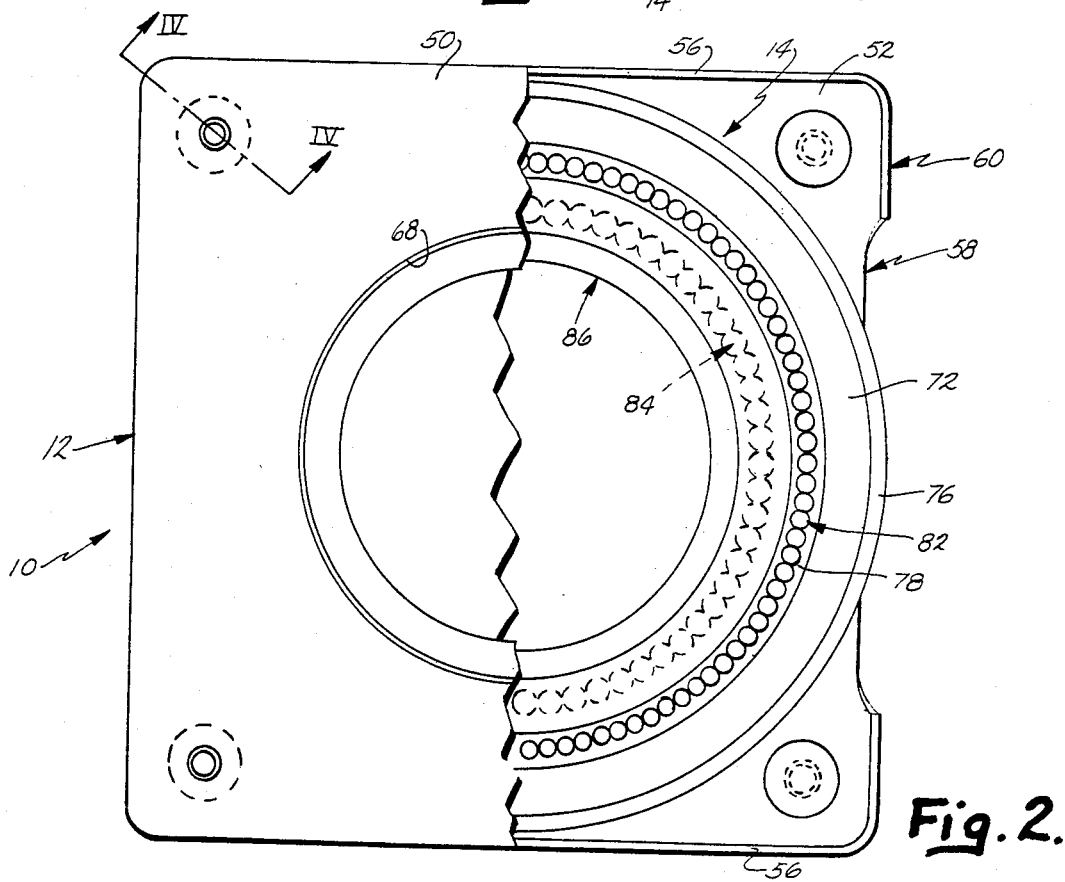

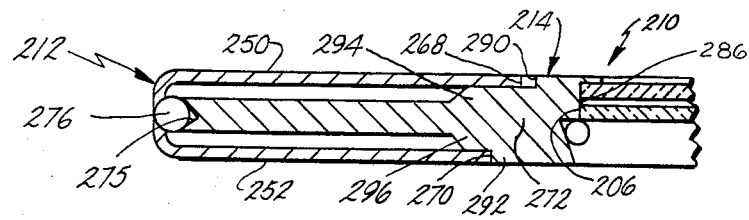
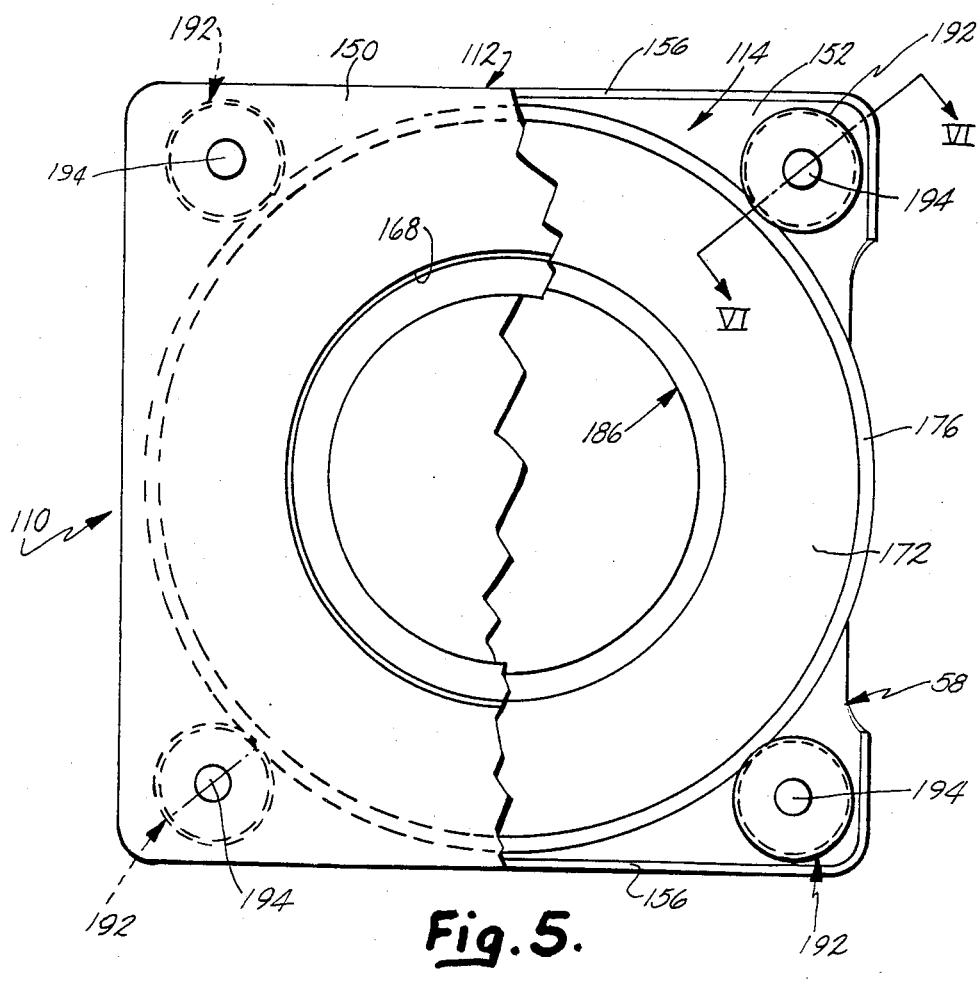
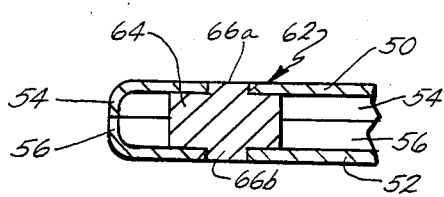
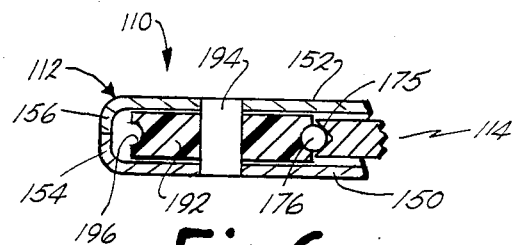

TRANSPARENCY MOUNT PROVIDING ROTATABLE PROJECTION IMAGE

BACKGROUND OF THE INVENTION

The present invention relates to slide mounts for film transparencies.

A wide variety of projectors have been developed for projecting film transparencies onto projection screens or other suitably reflective surfaces. Typically, the transparencies are individually mounted in slide mounts which in turn are stored within slide racks or trays, such as the well-known carousel-type tray. The trays are mounted on the projector for sequential transportation of the slides through the projection system. The most popular projectors are designed to handle the two-inch square slide mounts used to support 35-millimeter film transparencies. Additionally, the better projectors register each projected slide against a reference surface fixed with respect to the projection lens to provide a "critical focus" registration for each slide, eliminating the need to refocus each slide individually.

Although providing adequate projection of stationary images, known 35-millimeter projectors typically do not include structure for rotating the projected image. Rotation is desirable in many applications, such as planetarium shows, to provide a realistic display of a galaxy, planet, or satellite. Although highly specialized devices and projectors have been developed for rotatably supporting conventional 35-millimeter slide mounts, these devices are not without their drawbacks. One such system includes a relatively large slide-supporting assembly for rotatably supporting a slide mount. Additionally, this system includes a relatively complicated slide transportation mechanism for rotating the slide-supporting device. This projector is relatively complicated, expensive, and prone to down time because of the delicate mechanisms and slide-supporting devices involved. Second, the large, custom-made slide-supporting devices are not interchangeable with conventional slide mounts in a slide tray and, therefore, are not usable in conventional projectors.

SUMMARY OF THE INVENTION

The aforementioned problems are solved by the present invention wherein a slide mount is provided which can be used in conventional 35 millimeter slide projectors to rotatably support a film transparency during projection. More particularly, in a first aspect of the invention, the slide mount comprises a generally square planar body, a generally circular transparency-support assembly, and structure for rotatably supporting the transparency-support assembly on the body. Further the body includes a cutout portion along one of its edges through which the periphery of the transparency-support assembly is accessible for rotatable driving movement. Consequently, the present invention enables a film transparency to be rotatably supported on a slide mount having conventional dimensions so as to fit within a conventional projector.

In a second aspect of the invention, the slide mount further includes means for providing critical focus for the rotatable film transparency. More particularly, this slide mount comprises a body, including first and second parallel body halves, and a rotatable transparency-support assembly sandwiched therebetween. The slide mount further comprises two ball-bearing assemblies for supporting the rotatable disc against the two body halves. Therefore, the rotatable disc is precisely positioned against, and with respect to, both body halves to provide critical focus of the film transparency upon the proper registration of the slide mount body within the projector. This critical focus eliminates the need to refocus the projector individually for each slide.

These and other objects, advantages, and features of the invention will be more readily understood and appreciated by reference to the detailed description of the preferred embodiment and the drawings.

BRIEF DESCRIPTION OF THE DRAWINGS

FIG. 1 is a fragmentary, perspective view of the slide mount of the present invention supported within a projector;

FIG. 2 is a plan view of the slide mount with one body half partially broken away;

FIG. 3 is an elevational view of the slide mount partially broken away to show the mount in cross section;

FIG. 4 is an enlarged, fragmentary, sectional view taken along plane IV—IV in FIG. 2;

FIG. 5 is a plan view of an alternative embodiment of the slide mount with one body half partially broken away;

FIG. 6 is an enlarged, fragmentary, sectional view taken along plane VI—VI in FIG. 5; and FIG. 7 is a fragmentary, sectional view of another alternative embodiment of the slide mount.

DETAILED DESCRIPTION OF THE PREFERRED EMBODIMENT

A slide mount constructed in accordance with a preferred embodiment of the invention is illustrated in FIGS. 1–4 and generally designated 10. As seen in FIG. 1, the mount generally comprises square planar body 12 and transparency-support assembly 14 rotatably mounted therein. Film or transparency 18 is supported within assembly 14 for rotation therewith during projection.

Projector 20 (FIG. 1), in which slide mount 10 is mounted includes lamp 22 and slide reception mechanism 36. The reception area includes three orthogonal reference surfaces 38, 40, and 42 against which mount 10 is registered to provide consistent image placement and focus on screen 24. Registration arm 28 reciprocates in a direction indicated by double-headed arrow 44 during insertion and removal of slide mount 10 from area 36. More particularly, arm 28 shifts to the right as viewed in FIG. 1 when one slide mount 10 is removed upwardly from projector 20. After a new slide mount 10 has dropped onto reference surface 38 and registered thereagainst under gravity, registration arm 28 returns to the left to engage slide mount 10 registering the slide mount against reference surface 40. The registration of slide mount 10 against surfaces 38 and 40 insures the consistent positioning from slide-to-slide of images 26 on screen 24. Rotatable drive wheel 30 is supported on arm 28 and is rotatably driven by belt 31 using known technology. Arm 28 is selectively reciprocated so that drive wheel 30 selectively engages the outer periphery of transparency support assembly 14.

Reciprocating arm 46 (FIG. 1) is included on projector 20 and reciprocates in the direction of double-headed arrow 48 to register slide mount 10 against reference surface 42. Gate 48 shifts away from reference surface 42 while slide mounts 10 are removed upwardly from and inserted downwardly into reception area 36;

arm 46 returns to the position illustrated in FIG. 1 after a slide mount has been received on reference surface 38 to register the slide mount against surface 42 to provide critical focus, eliminating the need to refocus the lens assembly (not shown) upon the introduction of each slide mount 10 into reception area 36.

Turning more specifically to the construction of slide mount 10 (FIGS. 2-4), body 12 comprises two generally parallel, planar, stainless steel body halves 50 and 52. Each of the body halves is generally square and includes a peripheral edge 54 and 56, respectively, which is rolled to meet the opposite peripheral edge of the opposite body half to prevent dirt from entering body 12 and to reduce sharp edges to facilitate movement of mount 10 within and through the projector and slide tray. In the preferred embodiment, body 12 is approximately two inches square and no thicker than one-eighth inch, enabling mount 10 to be used in conventional 35-millimeter slide projectors. Cutout area 58 is formed along one edge 60 of body 12 to expose a portion of transparency-support assembly 14. The cutout extends approximately 3/5 of the length of edge 60 and is located generally midway therealong. As seen in FIGS. 2 and 4, body halves 50 and 52 are staked together between each of their four corners by studs 62, each of which includes a body portion 64 to space the body halves one from the other and opposite peened ends 66a and 66b to secure the stud to the body halves. Body halves 50 and 52 define apertures 68 and 70, respectively, in the central area of each body half. The periphery of aperture 70 is defined by beveled edge 71. The apertures are generally coaxially aligned in assembled mount 10.

Transparency-support assembly 14 (FIGS. 2 and 3) includes image wheel 72, transparent glasses 73a and 73b, and retainer ring 74. Preferably, image wheel 72 is fabricated of aluminum and hard-coat anodized to provide a high-wear surface. Alternatively, the image wheel can be fabricated of brass and chromium plated. Image wheel 72 is a generally circular member defining an outwardly facing peripheral V-groove 75 about its periphery. Resilient O-ring 76 is secured about the periphery of wheel 72 within groove 75 and is generally tangential to body edge 60 at cutout 58. V-shaped ball race 78 and rectangularly shaped ball race 80 are defined in opposite sides of wheel 72 to be generally concentric therewith. A plurality of stainless steel 3/64 inch diameter balls 82 are positioned within race 78 to rotatably engage both the wheel and body half 50. Similarly, a plurality of stainless steel 1/16 inch balls 84 are positioned within race 80 to rotatably engage both image wheel 72 and beveled edge 71 of body half 52. Therefore, image wheel 72 rides against, and is maintained in fixed axial relationship to, both halves 50 and 52.

Wheel 72 (FIGS. 2 and 3) defines in its central area a stepped bore 86 including annular lip 88 and beveled ring retaining shoulder 90. Glasses 73a and 73b are sandwiched together, with transparenacy 18 positioned therebetween and supported within aperture 86 abutting lip 88. Retaining ring 78 is a circular spring sprung-fit into aperture 86 and retained therein against beveled edge 90 to secure the glasses in position. Transparencies 18 may be readily inserted and removed from slide mount 10 by simply removing spring 78 and glasses 73 from wheel 72.

OPERATION

Slide mount 10 enables the image on transparency 18 to be rotated during projection to produce rotatable image 26 on screen 24 (FIG. 1). More particularly, mount 10 is transported by projector 20 via a known mechanism (not shown) and deposited downwardly into reception area 36 of projector 20 so that mount 10 registers against reference surface 38. Registration arm 28 then shifts leftwardly to engage mount 10 and register the mount against reference surface 40. Next, arm 46 shifts forwardly to register mount 10 against reference surface 42. This described three-way registration of slide mount 10 provides consistent placement of images 26 on screen 24 and also provides critical focus of transparencies 18.

With mount 10 so registered, drive wheel 30 engages O-ring 76 of film-support assembly 14. Wheel 30 is then driven in a direction and at a speed to produce the desired effect of image 26 on screen 24. When wheel 30 is rotated in direction 32, assembly 14 rotates in direction 33, and image 26 rotates in direction 34. As assembly 14 is rotated by wheel 30, balls 82 and 84 rotatably support the assembly against body halves 50 and 52, respectively. Mount 10 is removed from area 36 by shifting arm 46 and arm 28 away from the mount and lifting the mount upwardly out of the area.

As slide mount 10 is positiond within slide platform 36 (FIG. 1), lens side body half 50 abuts reference surface 42. Arm 46 abuts lamp body half 52 to urge the slide mount against reference surface 42. The precise spacing maintained between image wheel 72 and halves 50 and 52 by balls 82 and 84, respectively, provides critical focus for each slide mount 10 supported within platform area 36. Consequently, each transparency 18 supported in each slide mount 10 is consistently positioned a fixed distance from the lens assembly (not shown) to eliminate the need to separately focus each image 26 on screen 24.

Alternative Embodiments

A first alternative embodiment 110 of the slide mount is illustrated in FIGS. 5 and 6. Generally, the alternative slide mount includes body 112 and image wheel assembly 114 rotatably supported therein. Body 112 in turn comprises a pair of body halves 150 and 152 generally identical to their counterparts 50 and 52 in the previously described embodiment. Image wheel 172 is a generally circular member defining V-groove 175 about its periphery in which resilient O-ring 176 is positioned. Additionally, image wheel 172 defines a central aperture 186 in which is positioned a glass and retainer ring assembly similar to that of mount 10 for supporting a transparency within the aperture. TEFLON wheels 192 are rotatably supported between each of the four corners of body halves 150 and 152 on shafts 194. Each of wheels 192 defines a semicircular peripheral groove 196 dimensioned to receive O-ring 176 on image wheel 172. As seen in FIG. 5, wheels 192 are positioned to rotatably support image wheel 172 at four points within body 112 for rotational movement.

A second alternative embodiment 210 of the slide mount is illustrated in FIG. 7. Generally, the alternative slide mount 210 includes body 212 and image wheel assembly 214 rotatably supported therein. Body 210 comprises a pair of body halves 250 and 252 generally similar to their counterparts 50 and 52 and defining coaxial apertures 268 and 270, respectively. Image wheel 272 is a generally circular member defining V-groove 275 about its periphery in which resilient O-ring 276 is positioned. Image wheel 272 defines a central aperture 286 in which is positioned a glass and retainer ring assembly similar to that of mount 10 for supporting a transparency within the aperture. Concentric neck portions 290 and 292 extend from opposite sides of wheel 272 and are positioned within apertures 268 and 270, respectively. Neck 292 fits closely (e.g., 0.002 inch to 0.005 inch clearance) within aperture 270 to maintain radial alignment of image wheel 272 within body 212. Neck 290 may also fit closely within aperture 272, but this is not necessary as illustrated in FIG. 7. Shoulder portions 294 and 296 extend radially outwardly from neck portions 290 and 292, respectively, and engage body halves 250 and 252 to provide axial thrust bearings for "critical focus" registration. In this embodiment, stainless steel body halves 250 and 252 are preferably TEFLON-coated on all surfaces, and aluminum image wheel 272 is preferably hard-coat anodized and optionally TEFLON-coated.

The operation of slide mounts 110 and 210 are generally identical to that of slide mount 10 previously described. However, alternative slide mount 110 does not provide as precise a critical focus as slide mounts 10 and 210 because of the lack of means for registering image wheel 172 against either of body halves 150 and 152.

The above descriptions are those of preferred embodiments of the invention. Various alterations and changes may be made without departing from the spirit and broader aspects of the invention as defined in the appended claims, which are to be interpreted in accordance with the principles of patent law, including the doctrine of equivalents.

The embodiments of the invention in which an exclusive property or privilege is claimed are defined as follows:

1. A slide mount for rotatably supporting a transparency in critical focus within a slide projector including means for registering a slide mount for critical focus, said slide mount comprising:
   a generally planar support housing to be stationarily received within the registering means, said housing including first and second parallel generally planar housing portions defining first and second apertures, respectively;
   wheel means for supporting a transparency for projection, said wheel means being rotatably supported between said housing portions, said wheel means defining a third aperture in which the transparency is supported, said first, second, and third apertures being aligned whereby light can be directed therethrough to project an image from the transparency, said wheel means including a driven portion engageable through said housing to be selectively engageable by a drive member on the projector;
   first axial-support means for axially supporting said wheel means against said first housing portion; and
   second axial-support means for axially supporting said wheel means against said second housing portion, whereby the support provided to said wheel means by said first and second axial-support means provides critical focus of the rotatable transparency within the projector.

2. A slide mount as defined in claim 1 wherein said first axial-support means comprises:
   at least one of said wheel means and said first housing portion defining a first ball race; and
   a plurality of balls positioned within said first race to rotatably engage said wheel means and said first housing portion.

3. A slide mount as defined in claim 2 wherein said second axial-support means comprises:
   at least one of said wheel means and said second housing portion defining a second ball race; and
   a plurality of balls positioned within said second race to rotatably engage said wheel means and said second housing portion.

4. A slide mount as defined in claim 1 wherein said second axial-support means comprises:
   at least one of said wheel means and said second housing portion defining a second ball race; and
   a plurality of balls positioned within said second race to rotatably engage said wheel means and said second housing portion.

5. A slide mount as defined in claim 1 wherein said wheel means includes an outer periphery, and wherein said driven portion comprises a resilient ring positioned about said periphery.

6. A slide mount as defined in claim 5 wherein said wheel means includes a pair of transparent members releasably sandwiched together to receive the transparency therebetween.

7. A slide mount as defined in claim 1 wherein said wheel means includes a pair of transparent members releasably sandwiched together to receive the transparency therebetween.

8. A slide mount as defined in claim 1 wherein said first and second axial-support means comprise first and second surfaces, respectively, on said transparency support means, said first and second surfaces axially engaging said first and second housing portions, respectively.

9. A slide mount comprising:
   a generally square planar body no larger than approximately two inches by approximately two inches by approximately one-eighth inch, said body including first and second body portions defining first and second apertures, respectively;
   generally circular planar wheel means for supporting a transparency, said wheel means defining a third aperture within which the transparency is supported; and
   means for rotatably supporting said wheel means between said body portions with said first, second, and third apertures aligned whereby light can be directed therethrough to project an image from the transparency, said body including at least one edge at which the periphery of said wheel means is accessible, whereby said periphery can be engaged at said one edge to rotate said transparency means during projection, said rotatable-support means including first means for supporting said wheel means against said first body portion and second means for supporting said wheel means against said second body portion.

10. A slide mount as defined in claim 9 wherein said wheel means includes a resilient O-ring located about said wheel means periphery.

11. A slide mount as defined in claim 10 wherein said wheel means includes a pair of transparent members releasably sandwiched together to receive the transparency therebetween.

12. A slide mount as defined in claim 11 wherein said rotatable-support means comprises a plurality of wheels rotatably supported between said body portions, said wheels being positioned to engage and support said wheel means periphery.

13. A slide mount as defined in claim 12 wherein said wheel means includes a resilient O-ring located about said wheel means periphery.

14. A slide mount as defined in claim 13 wherein said wheel means includes a pair of transparent members releasably sandwiched together to receive the transparency therebetween.

15. A slide mount comprising:
a generally rectangular slide mount body having a first edge defining a cutout area, said body including first and second parallel generally planar body portions; and
a generally circular film-support assembly rotatably supported between said body portions, said film-support assembly including first and second means for axially supporting said film-support assembly against said first and second housing portions, respectively, the outer periphery of said transparency-support assembly being exposed at said cutout area, whereby said transparency-support assembly is engageable at said cutout area to be rotatably driven to rotate a film supported by said assembly during projection.

16. A slide mount as defined in claim 14 wherein said body comprises first and second parallel generally planar body halves, and wherein said slide mount further comprises first and second ball-bearing means for rotatably supporting said film-support assembly against said first and second housing halves, respectively.

17. A slide mount as defined in claim 14 wherein said body comprises first and second parallel planar body halves, and wherein said slide mount further comprises a plurality of wheels rotatably supported between said body halves and rotatably supporting the periphery of said film-support assembly.

18. A slide mount comprising:
a generally square planar body no larger than approximately two inches by approximately two inches by approximately one-eighth inch, said body including first and second opposite sides, said body defining first aperture means;
generally circular planar wheel means for supporting a transparency, said wheel means defining a second aperture; and
means for rotatably supporting said wheel means between said body sides with said first aperture means and said second aperture aligned, whereby light can be directed therethrough to project an image from the transparency, said body including at least one edge at which the periphery of said wheel means is accessible, whereby said periphery can be engaged at said one edge to rotate said transparency means during projection, said rotatable support means including means for maintaining a fixed axial relationship between said wheel means and said body.

* * * * *

UNITED STATES PATENT AND TRADEMARK OFFICE
CERTIFICATE OF CORRECTION

PATENT NO. : 4,548,486

DATED : October 22, 1985

INVENTOR(S) : Kenneth C. Mosley

It is certified that error appears in the above-identified patent and that said Letters Patent is hereby corrected as shown below:

Column 7, line 27:
   "14" should be --15--

Column 8, line 3:
   "14" should be --15--

Signed and Sealed this

Twenty-ninth Day of April 1986

[SEAL]

Attest:

DONALD J. QUIGG

Attesting Officer

Commissioner of Patents and Trademarks